United States Patent
Yasskin

(10) Patent No.: US 10,592,063 B1
(45) Date of Patent: Mar. 17, 2020

(54) CONTROLLING ACTIONS FOR BROWSER EXTENSIONS

(71) Applicant: GOOGLE LLC, Mountain View, CA (US)

(72) Inventor: Jeffrey Yasskin, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/871,944

(22) Filed: Jan. 15, 2018

Related U.S. Application Data

(63) Continuation of application No. 14/100,664, filed on Dec. 9, 2013, now Pat. No. 9,870,116.

(51) Int. Cl.
  *G06F 3/048* (2013.01)
  *G06F 3/0481* (2013.01)

(52) U.S. Cl.
  CPC .................. *G06F 3/0481* (2013.01)

(58) Field of Classification Search
  CPC .................................................. G06F 9/44526
  See application file for complete search history.

(56) References Cited

U.S. PATENT DOCUMENTS

| | | |
|---|---|---|
| 7,484,247 B2 | 1/2009 | Rozman et al. |
| RE43,103 E | 1/2012 | Rozman et al. |
| 8,200,962 B1 | 6/2012 | Boodman et al. |
| RE43,500 E | 7/2012 | Rozman et al. |
| RE43,528 E | 7/2012 | Rozman et al. |
| RE43,529 E | 7/2012 | Rozman et al. |
| 9,223,557 B1 * | 12/2015 | Gigliotti ................... G06F 8/61 |
| 2002/0002673 A1 | 1/2002 | Narin et al. |
| 2008/0184102 A1 | 7/2008 | Selig et al. |
| 2009/0287772 A1 | 11/2009 | Stone et al. |
| 2009/0288098 A1 * | 11/2009 | Abd-El-Malek ........ G06F 9/545 719/312 |

(Continued)

OTHER PUBLICATIONS

"chrome.declarativeContent", "chrome.declarativeContent", Google Chrome, retrieved on Dec. 6, 2013 from developer.chrome.com/extensions/declarativeContent.html, 4 pages., Dec. 6, 2013, 4.

(Continued)

*Primary Examiner* — Stephen S Hong
*Assistant Examiner* — Sanchita Roy
(74) *Attorney, Agent, or Firm* — Brake Hughes Bellerman LLP

(57) ABSTRACT

A method for controlling actions for browser extensions includes registering, at a browser process module, a list of one or more rules from a browser extension, where the rules define one or more conditions and one or more corresponding actions to take when the conditions are satisfied. A renderer process module that is in communication with the browser process module applies the conditions to content of web pages rendered in the browser application. The renderer process module determines whether any of the conditions are satisfied by the content of the web pages rendered in the browser application using the renderer process module. The browser process module or the renderer process module performs the actions defined in the rules in response to at least one of the conditions defined in the rules being satisfied.

27 Claims, 7 Drawing Sheets

(56) References Cited

U.S. PATENT DOCUMENTS

| | | | |
|---|---|---|---|
| 2012/0246701 A1* | 9/2012 | Swamy | G06F 17/00 |
| | | | 726/4 |
| 2013/0254855 A1* | 9/2013 | Walters | G06F 21/60 |
| | | | 726/5 |
| 2014/0047360 A1 | 2/2014 | Kay et al. | |
| 2014/0298405 A1 | 10/2014 | Qureshi et al. | |
| 2014/0337495 A1* | 11/2014 | Branton | H04L 63/10 |
| | | | 709/223 |
| 2015/0207852 A1 | 7/2015 | Boodman et al. | |

OTHER PUBLICATIONS

"chrome.declarativeWebRequest", "chrome.declarativeWebRequest", Google Chrome, retrieved on Dec. 6, 2013 from developer.chrome.com/extensions/declarativeWebRequest.html, 10 pages., Dec. 6, 2013, 10.

* cited by examiner

400

410 Register, at a browser process module, a list of one or more rules from a browser extension, where the rules define one or more conditions and one or more corresponding actions to take when the conditions are satisfied

420 Apply the conditions to content of web pages rendered in a browser application by a renderer process module that is in communication with the browser process module

430 Determine, by the renderer process module, whether any of the conditions are satisfied by the content of the web pages rendered in the browser application using the renderer process module

440 Perform, by the browser process module or the renderer process module, the actions defined in the rules in response to at least one of the conditions defined in the rules being satisfied

FIG. 4

CONTROLLING ACTIONS FOR BROWSER EXTENSIONS

CROSS REFERENCE TO RELATED APPLICATIONS

This application is a continuation of and claims priority to U.S. application Ser. No. 14/100,664, filed Dec. 9, 2013, and titled "Controlling Actions For Browser Extensions," which is hereby incorporated by reference in its entirety.

TECHNICAL FIELD

This description relates to systems and techniques for controlling actions for browser extensions.

BACKGROUND

A web browser is configured to render content from web pages and other sources. Web browser extensions (or browser extensions) and/or web browser applications (or web applications) may be installed in the web browser to provide additional functionality and features to enhance a user's browsing experience. For example, browser extensions may provide additional functionality and features based on the content from the web pages rendered in the web browser. It may be desirable to provide systems and techniques to control actions related to the browser extensions.

SUMMARY

According to one general aspect, a method for controlling actions for browser extensions includes registering, at a browser process module, a list of one or more rules from a browser extension, where the rules define one or more conditions and one or more corresponding actions to take when the conditions are satisfied. A renderer process module that is in communication with the browser process module applies the conditions to content of web pages rendered in the browser application. The renderer process module determines whether any of the conditions are satisfied by the content of the web pages rendered in the browser application using the renderer process module. The browser process module or the renderer process module performs the actions defined in the rules in response to at least one of the conditions defined in the rules being satisfied.

In another general aspect, a computing device includes memory configured to store executable instructions and at least one processor that is operably coupled to the memory using a bus and that is configured to execute the stored instructions. A browser process module is configured to register a list of one or more rules from a browser extension, where the rules define one or more conditions and one or more corresponding actions to take when the conditions are satisfied. A renderer process module is operably coupled to the browser process module and the renderer process module is configured to apply the conditions to content of web pages rendered in the browser application and determine whether any of the conditions are satisfied by the content of the web pages rendered in the browser application using the renderer process module. The browser process module or the renderer process module is configured to perform the actions defined in the rules in response to at least one of the conditions defined in the rules being satisfied.

In another general aspect, a non-transitory computer readable medium contains instructions that when executed by a microprocessor of a computer cause the computer to register, at a browser process module, a list of one or more rules from a browser extension, where the rules define one or more conditions and one or more corresponding actions to take when the conditions are satisfied. A renderer process module that is in communication with the browser process module applies the conditions to content of web pages rendered in the browser application. The renderer process module determines whether any of the conditions are satisfied by the content of the web pages rendered in the browser application using the renderer process modules. The browser process module or the renderer process module performs the actions defined in the rules in response to at least one of the conditions defined in the rules being satisfied.

Implementations of the above general aspects may include one or more of the following features. For example, applying the conditions may include preventing an extension process module associated with the browser extension from applying the conditions to the content of web pages rendered in the browser application. Performing the actions may include preventing an extension process module associated with the browser extension from performing the actions defined in the rules. Performing the actions may include performing the actions without allowing the browser extension to read the content of the web pages rendered in the browser application. Performing the actions may include displaying a page action for the browser extension to enable user access to the browser extension. Performing the actions may include hiding an element on a rendered web page to prevent display of the element to a user.

In one example implementation, one of the conditions may include matching at least a portion of a uniform resource locator (URL) defined in one of the conditions to at least a portion of a URL for a rendered web page. Applying the conditions may include determining whether the portion of URL of the rendered web page matches the portion of the URL defined in one of the conditions. Performing the actions may include performing the actions in response to determining a match between the portion of URL of the rendered web page and the portion of the URL defined in one of the conditions. The portion of the URL for the rendered web page may include a portion of a URL for a frame rendered within the rendered web page.

In another example implementation, one of the conditions may include matching a cascading style sheet (CSS) selector defined in one of the conditions to an HTML element on a rendered web page. Applying the conditions may include determining whether the HTML element of the rendered web page matches the CSS selector defined in one of the conditions. Performing the actions may include performing the actions in response to determining a match between the HTML element of the rendered web page and the CSS selector defined in one of the conditions.

In another example implementation, one of the conditions may includes matching text defined in one of the conditions to text on a rendered web page. Applying the conditions may include determining whether the text of the rendered web page matches the text defined in one of the conditions. Performing the actions may include performing the actions in response to determining a match between the text of the rendered web page and the text defined in one of the conditions.

The details of one or more implementations are set forth in the accompanying drawings and the description below. Other features will be apparent from the description and drawings, and from the claims.

BRIEF DESCRIPTION OF THE DRAWINGS

FIG. 4 is a flow diagram illustrating example operations of the system of FIG. 1.

Like reference symbols in the various drawings indicate like elements.

DETAILED DESCRIPTION

This document describes systems and techniques for controlling actions for browser extensions. A web browser, also referred interchangeably as a browser application, may render content from web pages. The web browser may include a browser process module and a renderer process module to control the browsing and rendering features and functions. For example, the browser process module may be considered a trusted module. Web browser extensions, also referred to interchangeably as browser extensions, may be installed in the web browser to provide additional features and functionality related to the content rendered in the web browser.

A browser extension may register a list of one or more rules with the browser process module, where the rules define one or more conditions and one or more corresponding actions to take when the conditions are satisfied. For example, a rule registered by a browser extension may define when to show a page action for the browser extension to enable user interaction with the browser extension. When web pages are rendered in the web browser, a renderer process module applies the registered rules to determine if any of the conditions is satisfied. If a condition is satisfied, then either the browser process module or the renderer process module performs the corresponding action specified in the rule. In this manner, it is the renderer process module, and not the browser extension, or an extension process module associated with the browser extension, that has access to the web page content to determine whether or not to take an action desired by the browser extension.

The browser extension does not need to ask permission and/or inject a script (e.g., a content script) to access the web page content in order to take a desired action, because the renderer process module handles the logic of applying the registered rules to the rendered content and taking the actions when a condition of the rules is met. The browser extension does not need to have access to the content of the web page in order for an action desired by the browser extension to be taken.

Figure 1:
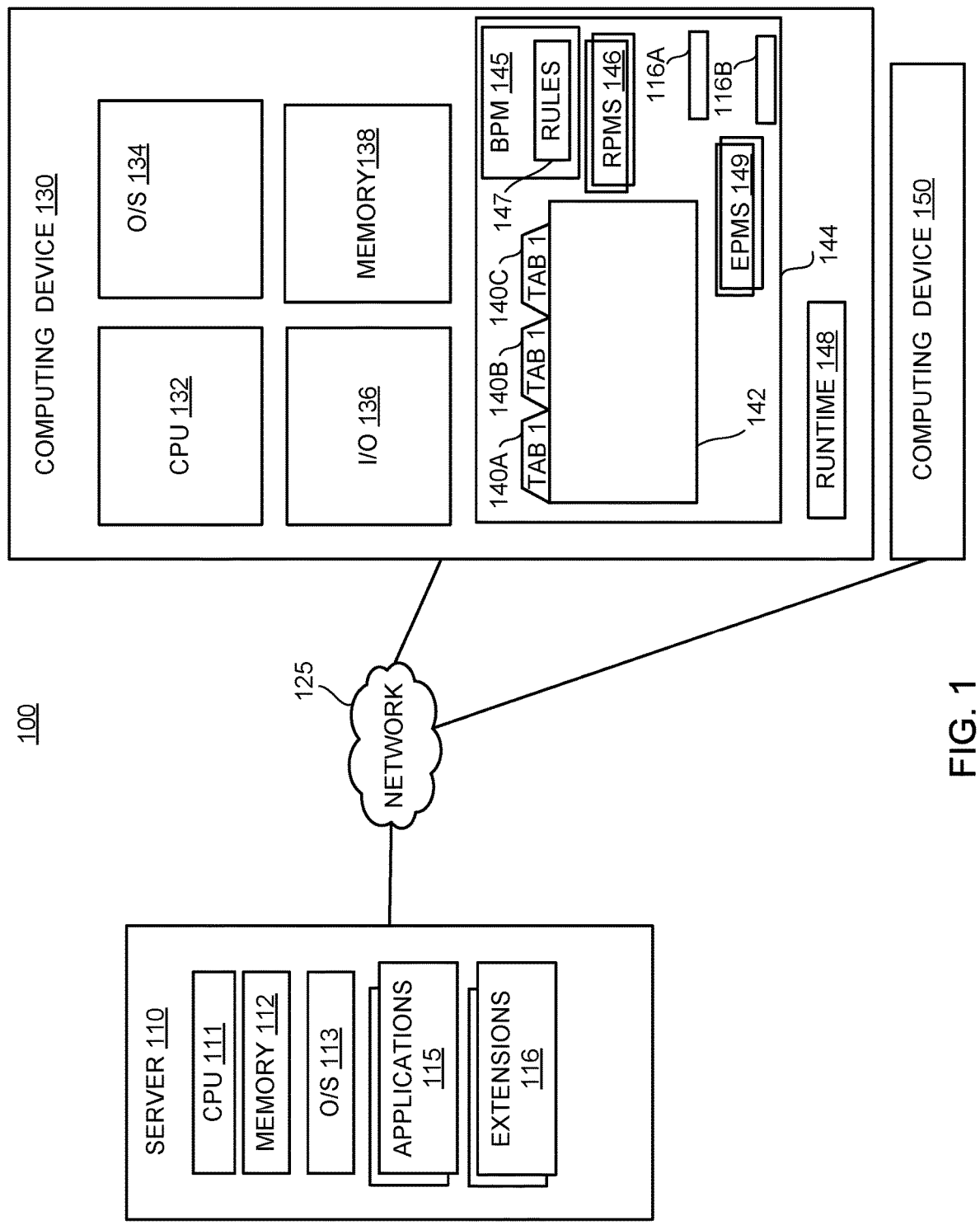
FIG. 1 is an example schematic diagram of a system configured to control actions for browser extensions.

FIG. 1 is an example schematic diagram of a system 100 configured to control actions for browser extensions. The system 100 includes server 110 operably connected to computing devices 130 and 150 via a network 125. The network 125 may be any type of network, such as the Internet. The network 125 may be implemented through a direct communication link, a local area network (LAN), a wide area network (WAN) and/or other suitable connections.

The server 110 may be a cloud server that includes a central processing unit (CPU) 111, a memory 112, an operating system (O/S 113), applications 115, and extensions 116. The server 110 may also host various APIs, which can be asynchronous.

Computing device 130 includes CPU 132, O/S 134, I/O 136 and memory 138. In one example implementation, the CPU 132 may be a microprocessor and the memory 138 may be a non-transitory computer-readable medium configured to store instructions that may be executed by the CPU 132, which causes the computing device 130 to perform one or more actions.

Computing device 130 also may include a browser application 144, which includes a browser interface 142, including tabs 140A, 140B, and 140C. The browser application 144 may execute browser extension 116A. Tabs 140A, 140B, and 140C may execute separate processes, as described in more detail below with respect to FIG. 2. In some implementations, the browser application 144 operating on computing device 130 may also host various APIs that are asynchronous.

The browser application 144 also may include a browser process module (BPM) 145 and one or more renderer process modules (RPMs) 146. The browser process module 145 may be a trusted module that is configured to control access to other files, applications and components of the computing device 130. The browser process module 145 may be referred to as a sandboxed process because it controls and limits access by other process modules (e.g., the RPMs 146) to the computing device 130 including the CPU 132, the O/S 134, the I/O 136 and the memory 138. The BPM 145 may enforce security policies regarding access to computing device 130 resources.

The RPMs 146 are renderer processes that are configured to render content related to a web page, web application, and/or a browser extension. A separate renderer process module 146 may be instantiated for each web page, web application, and/or browser extension. Each renderer process module may be separate processes that do not communicate with each other. For example, each of the tabs 140A, 140B and 140C may execute separate RPMs 146. The RPMs 146 may not have direct access to computing device resources and instead may interact only with the BPM 145 to request and receive desired computing device resources.

The computing device 130 includes a runtime 148. The runtime 148 may be an environment that is installed at computing device 130, which may provide various services to web applications, web browser extensions, and natively operating applications that are coded with web technology. For example, the runtime 148 may manage the install and uninstall of a web application, manage the lifecycle of a web application, send the web application events, and provide a rendering and JAVASCRIPT engine, API implementation, and windowing system for web applications. The runtime 148 may be installed with the browser application 144, or may be installed separately from a web browser, for example with an installation of a web application, or entirely separate of any other installation.

The computing device 150 may include similar elements as server 110 or computing device 130. The use of one server and two computing devices is merely for illustration, as any number and any configuration of servers, computing devices, and other computers may be used in system 100.

A web browser (e.g., the browser application 144) executed by the computing device 130 can receive code (e.g., HTML code, JavaScript, etc.) from the server 110 (e.g., a remote server that hosts a website) and can execute the received code on the device for the benefit of a user of the computing device 130.

In various implementations, the browser application 144 may include or be associated with one or more web applications (e.g., one or more of applications 115). In this context, a "web application" may be configured to perform a single task or multiple tasks for a user. In such an implementation, the web application may be built using web technologies (e.g., JAVASCRIPT, CSS, HTML) and may, in some implementations, be configured to be executed or interpreted by the web browser. Examples of web applications include games, photo editors, and video players that are run inside the browser.

Web applications can be "hosted applications" or "packaged applications." Hosted applications may include at least a portion of a web site that itself includes web pages, plus some metadata that may be especially pertinent to the web application or to the user of the web application to allow the web application to perform some particular functionality for the user. Packaged applications can be thought of as web applications whose code is bundled, so that the user can download all of the content of the web application for execution, for example by the browser. A packaged web application may not need to have network access to perform its functionality for the user, and rather may be executed (e.g., by the browser) locally on the computing device without access to a network. Packaged web applications have the option of using Extension APIs, allowing packaged applications to change the way the browser behaves or looks.

In various implementations, the web browser may include or be configured with various plug-in components, such as themes, backgrounds, or add-ons. A plug-in may be a set of software components that adds specific capabilities to a larger software application. A theme or background may include a favorite image and color scheme for a browser application.

In various implementations, the web browser may include or be configured to interact with one or more browser extensions (e.g., one of extensions 116). In this context, a "browser extension" may include one or more web pages packaged or grouped together as a definable whole, and configured to extend the functionality to the web browser. Thus, extensions also provide extra functionality to a browser, but generally, unlike web applications, there is little or no user interface component to the functionality provided by a browser extension. Instead, browser extensions extend the functionality of the browser and the websites being viewed in it. For example, browser extensions can extend the functionality of the browser by adding a new button to the address bar, such as an ever-present currency converter. Buttons like this can also apply to the current web site being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "mail this" button next to every link in every page. Compared to web applications, extensions cut across websites and web applications. Extensions may be in effect across all websites (though some are site-specific). Web applications may not combine with other applications in this way. Rather, web applications generally run standalone, like any regular website.

The browser application 144 also may include one or more extension process modules (EPMs) 149. The EPMs 149 may be configured to provide features and functionality for installed browser extensions. A single EPM 149 may be instantiated for each installed browser extension and, similar to the RPMs 149, may have no access to computing device resources other than through the BPM 145.

In one exemplary implementation, the browser application may run all top level pages from an installed application or extension application in the same process. In this manner, only one instance of critical systems related to the application is running at a time. As discussed in more detail below with respect to FIG. 2, each tab in the browser application may use a separate process to protect the overall browser application from bugs and glitches in a rendering engine associated with the browser application. Access may be restricted from one rendering engine process to other rendering engine processes and to the rest of the system. In this manner, one process running for one application or for one extension is isolated and separate from other processes running for other applications or for other extensions.

In the example depicted in FIG. 1, the browser application 144 also includes at least two plug-in components, which may be a theme, background, add-on, or extensions. For purposes of illustration, the plug-in components are described here as browser extensions 116A and 116B. Each browser extension may have a dedicated EPM 149 to run the extension processes and isolate the browser extensions from each other as well as from other web pages and application running in other RPMs 146. It also may be desirable to limit the access of the browser extensions 116A and 116B to content of the web pages.

In prior systems, the browser extensions may have been granted access to all content and data on web pages rendered in the browser application either by asking for and receiving permission from the BPM 145 or by injecting a script (e.g., a content script) into the web page. The browser extension may have had access to the web page content in order to determine an action to take based on the content, including the URL, of the web page. However, in this prior arrangement, the web page's content and data was exposed to the browser extension.

In this example implementation, the browser extensions 116A and 116B register a list of rules 147 with the BPM 145. Each browser extension 116A and 116B may register its own separate list of rules 147 with the BPM 145. The rules 147 define one or more conditions and corresponding actions to take when one or more of the conditions are satisfied based on the web page content. In some instances, the rules may be referred to as subscriptions that are registered to the BPM 145. The BPM 145 receives and stores the rules 147. Once the browser extension 116A and 116B register the rules 147, the browser extension does not apply the rules. That is, the browser extensions 116A and 116B may not determine whether or not the conditions of the rules are satisfied and may not take the corresponding action when the conditions are satisfied. The browser extensions 116A and 116B, and their instantiated EPMs 149, may be prevented from applying the rules to the web pages and may be prevented from performing the actions defined in the rules.

Instead, the RPMs 146 determine whether or not the conditions of the rules are satisfied and either the RPMs or the BPM 146 perform the corresponding action when the conditions are satisfied. In this matter, the web page content and data is not exposed to the browser extension. This may provide an even more secure browsing environment. The RPMs 146 may test the conditions against the renderer content because the RPMs 146 are aware of the content being rendered.

The rules 147 may define one or more conditions and one or more actions to take when the conditions are satisfied. For example, conditions may include the matching of at least a portion of a uniform resource locator (URL) of a rendered web page or at least a portion of a URL of a frame rendered in the web page. Conditions may include the matching of a one or more CSS selectors to an element in the web page. Conditions may include a regular expression that matches text on the rendered page.

Conditions also may include a combination of different types of conditions. For example, a condition may define a match to a URL on a web page and a CSS selector to an element on the web page. Also, a condition may specify that if a URL matches, then look for a CSS selector to match an element on the web page.

The RPMs 146 may apply the conditions to content of the web pages, including determining whether or not the conditions are satisfied. As discussed above, the EPMs 149 and the browser extensions 116A and 116B are prohibited from applying the rules including whether or not the conditions are satisfied. In this manner, the EPMs 149 and their respective browser extensions are not allowed to read the content of the web pages rendered in the browser application 144. In other example implementations, the RPMs 146 and/or the BPM 145 may apply the conditions to content of the web pages, including determining whether or not the conditions are satisfied.

When one or more conditions are satisfied, the BMP 145 and/or the RPMs 146 may perform the action defined in the rules. For example, an action may include showing the page action icon for the browser extension. Page actions represent actions that can be taken on the current web page. A page action icon may be is an icon that is made visible to the user such that the user may select the displayed icon and interact with the browser extension. When a user selects the page action icon for a browser extension, the browser extension then may be granted access to the content of the web page in order to provide the functionality or extension features of the browser extension. However, it is not until the user decides to interact with the browser extension that the browser extension is granted access to the web page, as controlled by the BPM 145.

In the above example, it should be noted that prior to the condition being satisfied, the page action icon for the browser extension may not be displayed or may be grayed out, thus preventing user interaction with the browser extension until such time that one or more of the conditions are satisfied to cause the BPM 145 or the RPM 146 to perform the action of displaying the page action icon.

In another example, an action may include hiding an element and/or hiding text on the rendered web page. For example, if the one or more conditions are satisfied as determined by the RPM 146, then the corresponding action may be performed by the BPM 145 and/or the RPM 146 to hide a specified element and/or text on the rendered web page as defined in the registered rule. As discussed above, the rule is applied and the action is performed without the content of the web page being exposed to the browser extension.

In another example, an action may include changing the characteristics of an element or text on the rendered web page. For example, if the one or more conditions are satisfied as determined by the RPM 146, then the corresponding action may be performed by the BPM 145 and/or the RPM 146 to change the characteristic of an element or text on the web page as defined in the registered rule. For example, the action may be to turn a phone number that is in regular text into a user-selectable link that when selected may activate a VoIP application or extension. These and other examples are discussed below in more detail with respect to FIGS. 3A-3C.

Figure 2:
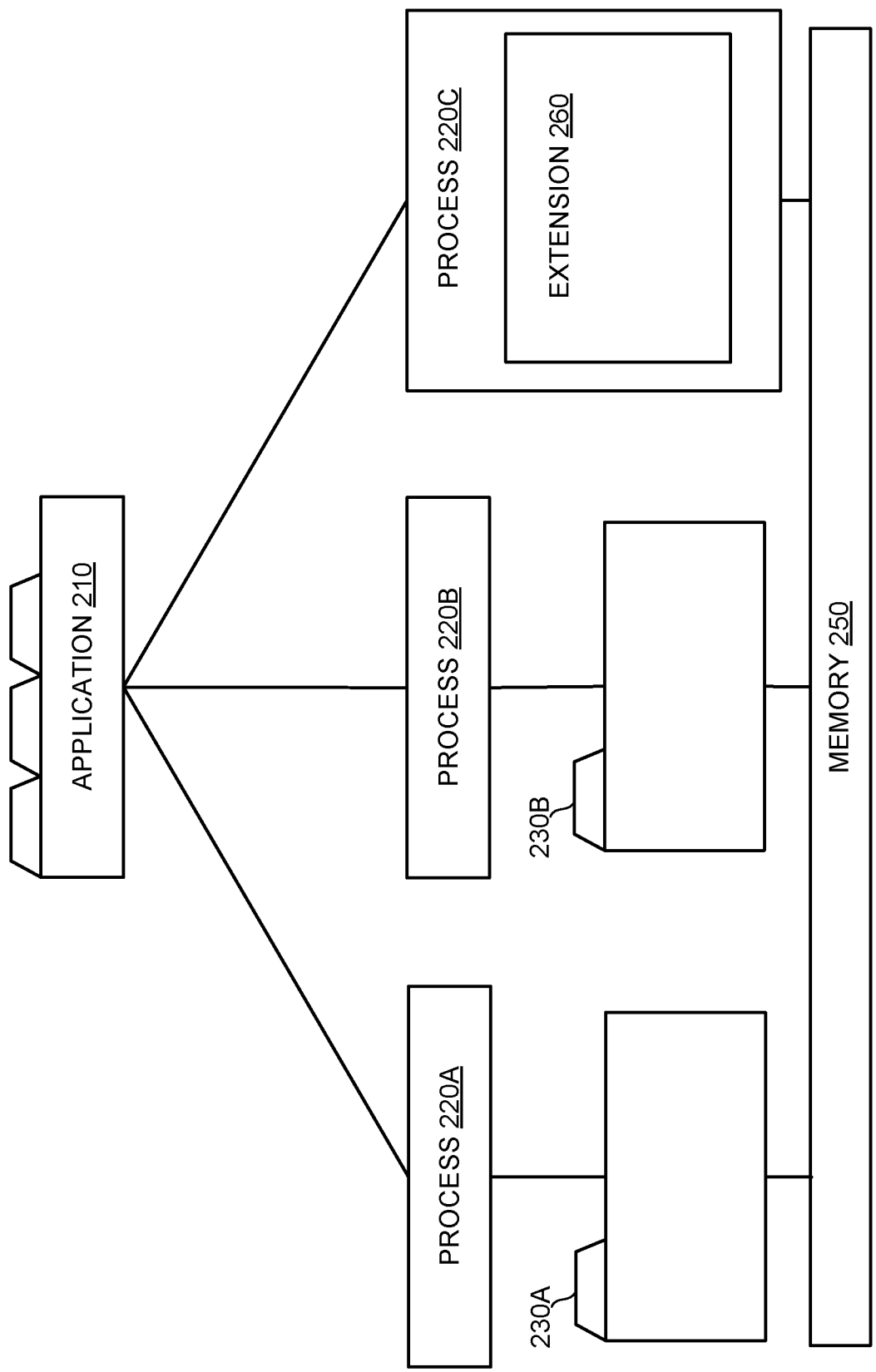
FIG. 2 is an example block diagram of a multi-process application configuration.

FIG. 2 is an example block diagram of a browser process configuration. As discussed above, in a multi-process system, separate processes may render separate tabs, which may create separate JavaScript threads as well. As shown in FIG. 2, application 210 (which may be, for example, a web browser, a runtime environment, or another application) may execute separate processes 220A, 220B, 220C, which may each display separate tabs (such as 230A and 230B). Tabs 230A and 230B may be separate windows of a web browser, for example, and may each execute separate processes that each have read/write access to at least a portion of a memory 250 of a computing device, each process having its own memory and its own copy of global data structures. One tab (e.g., tab 230A) may be busy while all the other tabs are in use. If there is an error in the renderer of one tab, it may not affect the other tabs, or crash the entire application 210.

In some implementations, a process, such as process 220C, may implement an extension 260. In this context, an "extension" or "browser extension" may include one or more web pages packaged or grouped together as a definable whole, and configured to extend the functionality to the web browser. Browser extensions may be webpages and may use all application programming interfaces (APIs) that the browser application provides to web pages. A browser extension may include HTML, CSS, JAVASCRIPT, images, other types of files, and web-related computer languages and code. Thus, browser extensions also provide extra functionality to a browser, but generally, unlike web applications, there is little or no user interface component to the functionality provided by a browser extension. Instead, browser extensions extend the functionality of the browser and the websites being viewed in it. For example, browser extensions can extend the functionality of the browser by adding a new button to the address bar, such as an ever-present currency converter. Buttons like this can also apply to the current web site being viewed—for example, clicking the currency converter button can convert all prices on the website presented to a user into a currency chosen by the user. In another example, an extension can be installed so that when a user hovers a cursor over a thumbnail image on a webpage executed by a browser a larger-size version of the image is displayed until the user moves the cursor away from the image. In another example, an extension may be installed to embed a "mail this" button next to every link in every page. Compared to web applications, extensions cut across websites and web applications. Extensions may be in effect across all websites (though some are site-specific). Web applications may not combine with other applications in this way. Rather, web applications generally run standalone, like any regular website.

In the implementation shown in FIG. 2, the extension 260 may be a zipped file (such as a .CRX file) that includes a manifest file with metadata describing the extension, and an HTML file. The manifest may be a .JSON or other file format.

Figure 3A:
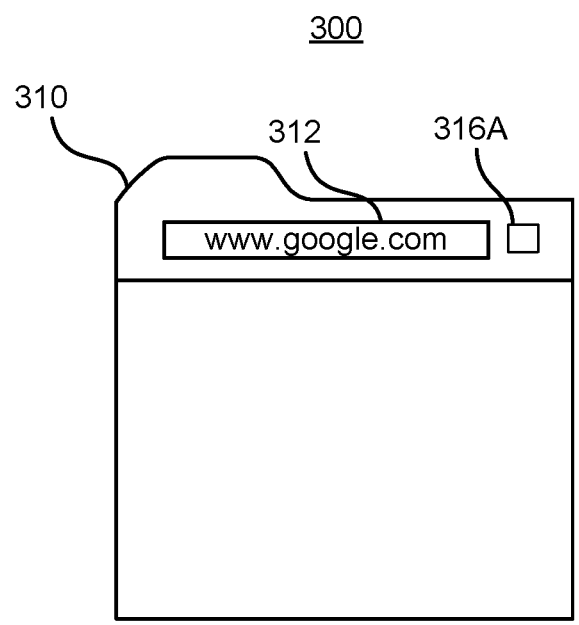
FIGS. 3A-3C are diagrams of example user interfaces of a browser application.
Figure 3B:
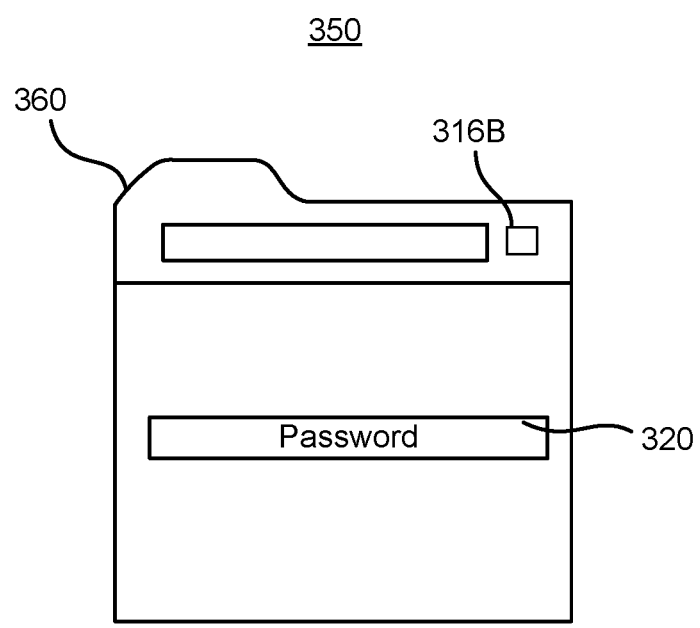
Figure 3C:
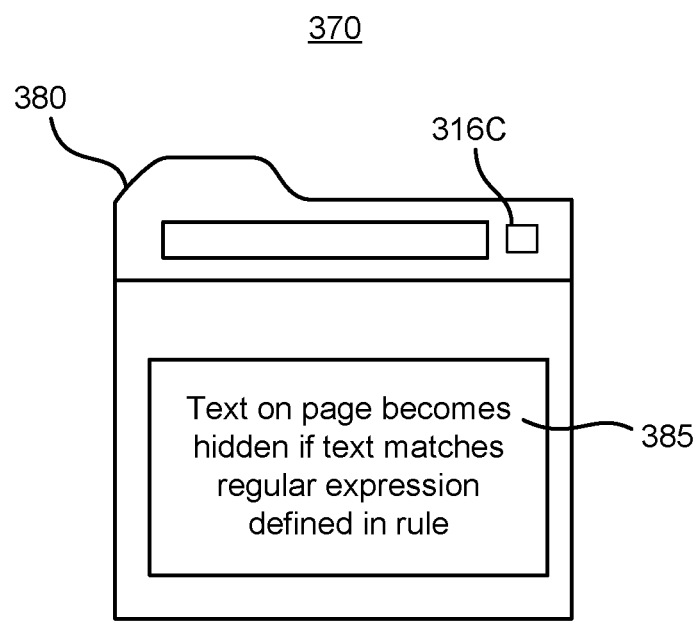

FIGS. 3A-3C provide examples of browser extension rules 147 registered with the BPM 145 as applied and performed. FIG. 3A is an example user interface 300 for a browser application. For example, the computing device 130 of FIG. 1 may display the user interface when a user browses or navigates to a web page. In this example, a browser tab 310 may include a browser extension. The browser extension may be represented by a page action icon 316A. However, the page action icon 316A may not be displayed on every web page, but only on pages where a registered rule is satisfied.

In the example of FIG. 3A, one rule registered by a browser extension may specific that if the URL 312 of the page matches a URL defined in the condition, then perform a specified action. For instance, the action may be to display the page action icon 316A. Otherwise, if the URL does not match, then the page action icon is not displayed. The RPM 146 applies the condition to determine if there is a match with the URL and, if there is a match, then the BPM 145 or the RPM 146 performs the action of displaying the page action icon 316A. Once the page action icon 316A is displayed, a user may interact with the page action icon 316A and the browser extension. After selection of the page action icon 316A, the browser extension may access content on the web page as may be needed for the functionality or features of the particular browser extension.

A match of the URL may not need to be a full match, but may be a partial match. The condition may apply to the URL for top level pages displayed within the browser tab 310 and/or may apply to other URLs within the page such as ones that may be associated with a frame within the page.

FIG. 3B illustrates an example user interface 350 of a browser application with a browser tab 360. In this example, a browser extension may register a rule with the BPM 145 that specifies to display the page action icon 316B for the browser extension when the web page includes a password field 320 CSS selector element. In this manner, whenever a web page includes a password field 320, the BPM 145 or the RPM 146 causes the page action icon 316B to be displayed. This may be useful for a browser extension that is a password manager extension. Also, the URL of the web page does not matter for the rule to be satisfied.

If the web page runs a script and changes which elements on the page are visible, then the page action icon may be displayed based on whether the CSS selectors currently match what is being displayed. The page action icon may be hidden if the CSS selectors do not match what is being displayed on the web page.

FIG. 3C illustrates an example user interface 370 of a browser application with a browser tab 380. In this example, a browser extension may register a rule with the BPM 145 that defines an action to take if text on the web page matches a regular expression defined in the rule. For example, the defined action may include hiding the matching text, hiding an element on the web page and/or displaying the page action icon 316C for the browser extension.

In example implementation, the rule may include an expression with a list of undesirable words (e.g., curse words). When a web page on the browser tab 380 is rendered, the RPM 146 applies the condition by determining if any of the text 385 on the page matches the text in the regular expression. If there is a match, the rule may define the action to take including deleting the text or hiding the text such that the matching text is not displayed to the user.

In other example implementations, a regular expression condition may be used to determine if there is an address on a page and, if so, to display the page action icon for the browser extension. In this example, the browser extension may be a mapping extension, which if selected by the user would show a map of the address. As discussed in detail above, the browser extension only gains access to the address once the page action icon is displayed and is selected by the user. The rule is applied by and the action of displaying the page action icon is performed by the BPM 145 and/or the RPM 146.

In another similar example, a rule may be defined to match a phone number in the text of the web page, and if a match occurs, then a page action icon for a browser extension is displayed. If the page action icon is selected by a user, the browser extension is then given access to the phone number on the page and may use it, for example, to offer to call the number for the user.

Another example includes turning the text in the web page into a selectable link to enable selection by the user. The rule also may provide an option to select the browser extension in a context menu that is displayed by selecting the link. If other text is selected, the context menu may not include the browser extension. Another example includes sending a message to the browser extension.

FIG. 4 is a flow diagram illustrating example operations of the system of FIG. 1. Process 400 includes registering, at a browser process module, a list of one or more rules from a browser extension, where the rules define one or more conditions and one or more corresponding actions to take when the conditions are satisfied (410). For example, with reference to FIG. 1, a browser extension 116A may register a list of rules 147 with the BPM 145. The BPM 145 may store multiple lists of rules. The BPM 145 may store a different set of rules 147 for each browser extension. Thus, the browser extension 116A may register one set of rules with the BPM 145 and the browser extension 116B may register a different set of rules with the BPM 145.

Process 400 includes applying the conditions to content of web pages rendered in a browser application by a renderer process module that is in communication with the browser process module (420). For example, the RPM 146 may apply the conditions stored by the BPM 145 to content of web pages rendered in the browser application 144. In one example implementation, each time content changes in the browser application 144 the RPM 146 may apply the conditions to determine if any of the conditions defined in the rules are met, including each time a new page is navigated to or each time content changes on a page without navigation. As discussed above, the browser extensions 116A and 116B and their corresponding EPMs 149 are prevented from applying the rules to web pages rendered in the browser application.

Process 400 includes determining, by the renderer process module, whether any of the conditions are satisfied by the content of the web pages rendered in the browser application using the renderer process module (430). For example, the RPM 146 determines whether any of the conditions are satisfied by the content that is rendered by the RPM 146.

Process 400 includes performing, by the browser process module or the renderer process module, the actions defined in the rules in response to at least one of the conditions defined in the rules being satisfied (440). For example, the BPM 145 or the RPMs 146 perform the actions defined in the rules 147 in response to at least one of the conditions defined in the rules being satisfied. In this manner, the browser extensions 116A and 116B and their corresponding EPMs 149 are prevented from performing the actions defined in the rules. The actions are performed without allowing the browser extensions 116A and 116B to read the content of the web pages rendered in the browser application.

Figure 5:
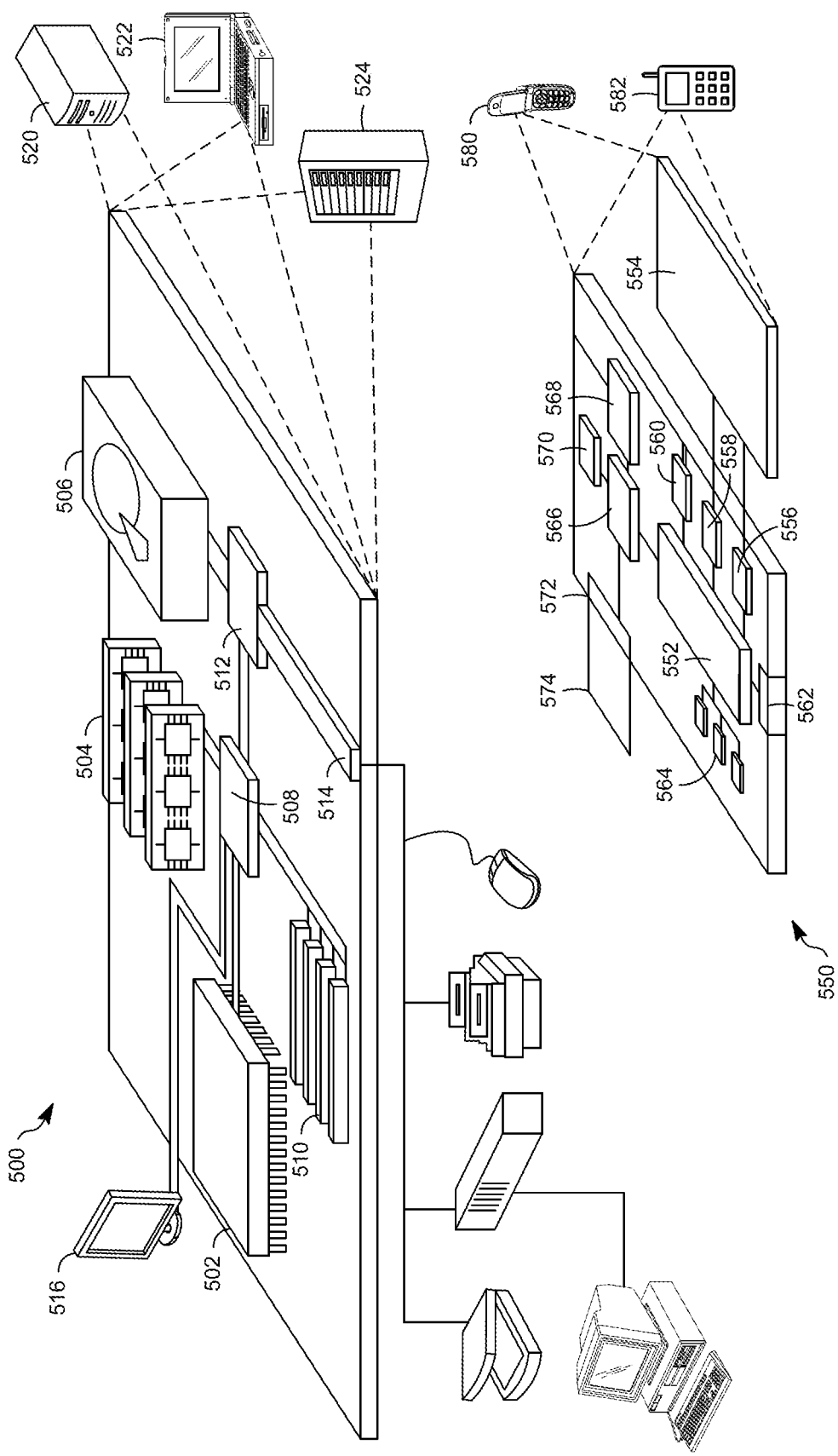
FIG. 5 is a block diagram showing example or representative computing devices and associated elements that may be used to implement systems and methods in accordance with FIGS. 1-4.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made to the implementations described herein.

In addition, the logic flows depicted in the figures do not require the particular order shown, or sequential order. In addition, other steps may be provided, or steps may be eliminated, from the described flows, and other components may be added to, or removed from, the described systems. Accordingly, other implementations are within the scope of the following claims.

What is claimed is:

1. A method for using a browser extension to block content, the method comprising:
registering, at a browser process module on a computing device, a first browser extension for blocking content from a webpage and one or more rules defined by the first browser extension for when to block the content from the webpage, the webpage being separate from the first browser extension, wherein:
the browser process module is a process module to register multiple browser extensions and to control access by other process modules, including a renderer process module, to resources of the computing device, using rule-based security policies,
the first browser extension is prevented from accessing the content from the webpage,
the rules include one or more conditions and one or more actions that correspond to the one or more conditions that are applied during a webpage rendering process, the rules defining the one or more conditions to apply to the webpage and the one or more corresponding actions to take when one or more of the conditions are satisfied, and
at least one of the conditions includes matching at least a portion of a predefined uniform resource locator (URL) to at least a portion of a URL of the webpage;
applying, by the renderer process module that is in communication with the browser process module, the one or more conditions to the content of the webpage while preventing access to the content by the first browser extension and the browser process module, wherein the renderer process module is a different process module than the browser process module;

determining, by the renderer process module, whether any of the one or more conditions are satisfied by the content of the webpage; and in response to at least one of the conditions defined in the rules being satisfied, performing, by the browser process module or the renderer process module, the one or more actions corresponding to the at least one satisfied condition defined in the rules, wherein:

at least one of the corresponding actions includes blocking at least a portion of the content of the webpage from being displayed.

2. The method of claim 1, further comprising:
displaying any unblocked content of the webpage.

3. The method of claim 1, wherein:
one of the one or more conditions includes matching a predefined cascading style sheet (CSS) selector to an HTML element of the webpage.

4. The method of claim 1, wherein:
one of the one or more conditions includes matching a predefined cascading style sheet (CSS) selector to an HTML element of the webpage and matching at least the portion of the predefined URL to at least the portion of the URL of the webpage.

5. The method of claim 4, wherein:
at least one of the one or more corresponding actions includes blocking text of the webpage from being displayed.

6. The method of claim 4, wherein:
at least one of the one or more corresponding actions includes blocking the HTML element of the webpage from being rendered.

7. The method of claim 1, wherein applying the one or more conditions includes preventing an extension process module associated with the first browser extension from applying the one or more conditions to the content of the webpage rendered in the browser application.

8. The method of claim 1, wherein performing the one or more actions includes preventing an extension process module associated with the first browser extension from performing the one or more actions defined in the rules.

9. The method of claim 1, wherein performing the one or more actions includes performing the one or more actions while preventing access by the first browser extension to the content of the webpage rendered in the browser application.

10. A system, comprising:
memory configured to store executable instructions;
at least one processor that is operably coupled to the memory and that is configured to execute the stored instructions to implement a browser process module and a renderer process module, wherein:
the browser process module is configured to register a first browser extension for blocking content from a webpage and one or more rules defined by the first browser extension for when to block the content from the webpage, the webpage being separate from the first browser extension, wherein:
the browser process module is a process module to register multiple browser extensions and to control access by other process modules, including the renderer process module, to resources of the computing device, using rule-based security policies,
the first browser extension is prevented from accessing the content from the webpage,
the rules include one or more conditions and one or more actions that correspond to the one or more conditions that are applied during a webpage rendering process, the rules defining the one or more conditions to apply to the webpage and the one or more corresponding actions to take when one or more of the conditions are satisfied, and
at least one of the conditions includes matching at least a portion of a predefined uniform resource locator (URL) to at least a portion of a URL of the webpage;
the renderer process module is operably coupled to the browser process module, wherein the renderer process module is a different process module than the browser process module and the renderer process module is configured to:
apply the one or more conditions to the content of the webpage while preventing access to the content by the first browser extension and the browser process module, and
determine whether any of the one or more conditions are satisfied by the content of the webpage, wherein
in response to at least one of the conditions defined in the rules being satisfied, the browser process module or the renderer process module is configured to perform the one or more actions corresponding to the at least one satisfied condition defined in the rules, and
at least one of the corresponding actions includes blocking at least a portion of the content of the webpage from being displayed.

11. The system of claim 10, wherein the browser process module or the renderer process module is configured to display any unblocked content of the webpage.

12. The system of claim 10, wherein:
one of the one or more conditions includes matching a predefined cascading style sheet (CSS) selector to an HTML element of the webpage.

13. The system of claim 10, wherein:
one of the one or more conditions includes matching a predefined cascading style sheet (CSS) selector to an HTML element of the webpage and matching at least the portion of the predefined URL to at least the portion of the URL of the webpage.

14. The system of claim 13, wherein:
at least one of the one or more corresponding actions includes blocking text of the webpage from being displayed.

15. The system of claim 13, wherein:
at least one of the one or more corresponding actions includes blocking the HTML element of the webpage from being rendered.

16. The system of claim 10, further comprising an extension process module that is associated with the first browser extension, wherein the extension process module is prevented from applying the one or more conditions to the content of the webpage rendered in the browser application.

17. The system of claim 10, further comprising an extension process module that is associated with the first browser extension, wherein the extension process module is prevented from performing the one or more actions defined in the rules.

18. The system of claim 10, wherein the browser process module or the renderer process module perform the one or more actions while preventing access by the first browser extension to the content of the webpage rendered in the browser application.

19. A non-transitory computer readable medium containing instructions that when executed by a microprocessor of a computer cause the computer to:
   register, at a browser process module on a computing device, a first browser extension for blocking content from a webpage and one or more rules defined by the first browser extension for when to block the content from the webpage, the webpage being separate from the first browser extension, wherein:
      the browser process module is a process module to register multiple browser extensions and to control access by other process modules, including a renderer process module, to resources of the computing device, using rule-based security policies,
      the first browser extension is prevented from accessing the content from the webpage,
      the rules include one or more conditions and one or more actions that correspond to the one or more conditions that are applied during a webpage rendering process, the rules defining the one or more conditions to apply to the webpage and the one or more corresponding actions to take when one or more of the conditions are satisfied, and
      at least one of the conditions includes matching at least a portion of a predefined uniform resource locator (URL) to at least a portion of a URL of the webpage;
   apply, by the renderer process module that is in communication with the browser process module, the one or more conditions to the content of the webpage while preventing access to the content by the first browser extension and the browser process module, wherein the renderer process module is a different process module than the browser process module;
   determine, by the renderer process module, whether any of the one or more conditions are satisfied by the content of the webpage; and
   in response to at least one of the conditions defined in the rules being satisfied, perform, by the browser process module or the renderer process module, the one or more actions corresponding to the at least one satisfied condition defined in the rules, wherein:
      at least one of the corresponding actions includes blocking at least a portion of the content of the webpage from being displayed.

20. The non-transitory computer readable medium of claim 19, further comprising instructions that when executed by the microprocessor of the computer cause the computer to:
   display any unblocked content of the webpage.

21. The non-transitory computer readable medium of claim 19, wherein:
   one of the one or more conditions includes matching a predefined cascading style sheet (CSS) selector to an HTML element of the webpage.

22. The non-transitory computer readable medium of claim 19, wherein:
   one of the one or more conditions includes matching a predefined cascading style sheet (CSS) selector to an HTML element of the webpage and matching at least the portion of the predefined URL to at least the portion of the URL of the webpage.

23. The non-transitory computer readable medium of claim 22, wherein:
   at least one of the one or more corresponding actions includes blocking text of the webpage from being displayed.

24. The non-transitory computer readable medium of claim 22, wherein:
   at least one of the one or more corresponding actions includes blocking the HTML element of the webpage from being rendered.

25. The non-transitory computer readable medium of claim 19, wherein the instructions that cause the computer to apply the one or more conditions include instructions that cause the computer to prevent an extension process module associated with the first browser extension from applying the one or more conditions to the content of the webpage rendered in the browser application.

26. The non-transitory computer readable medium of claim 19, wherein the instructions that cause the computer to perform the one or more actions include instructions that cause the computer to prevent an extension process module associated with the first browser extension from performing the one or more actions defined in the rules.

27. The non-transitory computer readable medium of claim 19, wherein the instructions that cause the computer perform the one or more actions includes instructions that cause the computer to perform the one or more actions while preventing access by the first browser extension to the content of the webpage rendered in the browser application.

* * * * *